(12) United States Patent
Yoshimura (10) Patent No.: US 7,170,699 B2
(45) Date of Patent: Jan. 30, 2007

(54) MASTER DISK HAVING GROOVES OF DIFFERENT DEPTHS FOR MAGNETIC PRINTING AND MANUFACTURING METHOD THEREFOR

(75) Inventor: Hiroyuki Yoshimura, Nagano (JP)

(73) Assignee: Fuji Electric Holdings Co., Ltd., Tokyo (JP)

( * ) Notice: Subject to any disclaimer, the term of this patent is extended or adjusted under 35 U.S.C. 154(b) by 501 days.

(21) Appl. No.: 10/788,424

(22) Filed: Mar. 1, 2004

(65) Prior Publication Data

US 2004/0228035 A1   Nov. 18, 2004

(30) Foreign Application Priority Data

Mar. 19, 2003   (JP)  ............... 2003-076451

(51) Int. Cl.
   *G11B 5/86*   (2006.01)
   *G11B 5/82*   (2006.01)
(52) U.S. Cl. ........................... 360/17; 360/135
(58) Field of Classification Search ............ None
   See application file for complete search history.

(56) References Cited

U.S. PATENT DOCUMENTS 4,723,903 A    2/1988  Okazaki et al.
6,748,865 B2 *  6/2004  Sakurai et al. ............. 101/483
6,816,330 B2 * 11/2004  Ikeda et al. ................. 360/59
6,879,453 B2 *  4/2005  Saito ........................... 360/17

FOREIGN PATENT DOCUMENTS

| EP | 1211040    | 6/2002 |
| JP | 05-182188  | 7/1993 |
| JP | 07-153122  | 6/1995 |
| JP | 2001-034938| 2/2001 |
| WO | WO00/26904 | 5/2000 |

* cited by examiner

Primary Examiner—A. J. Heinz
(74) Attorney, Agent, or Firm—Rabin & Berdo, P.C.

(57) ABSTRACT

A master disk has an aspect ratio of a width of a groove to a depth thereof to facilitate embedding of a soft magnetic film in the groove for stabilizing magnetic printability. The master disk has at least two differently shaped grooves, in each of which the width of the groove is equal to the width in the sector direction of a servo pattern and the depth is varied. A servo pattern has a width equal to a width of the groove in the sector direction, with the depth of the groove being proportional to the servo pattern width. At least two depths of grooves are provided for embedding magnetic materials on a substrate of the master disk. The depth of the groove for embedding the soft magnetic film is made shallow in a region where the pattern width of the servo pattern is narrow and made deep in a region where the pattern width is wide.

10 Claims, 10 Drawing Sheets

Fig. 10

MASTER DISK HAVING GROOVES OF DIFFERENT DEPTHS FOR MAGNETIC PRINTING AND MANUFACTURING METHOD THEREFOR

BACKGROUND OF THE INVENTION

The invention relates to a master disk for magnetic printing and a method of manufacturing the same. More particular, the invention is directed to a master disk and its method of manufacturing for magnetic printing, provided so as to write servo signals for positioning a head or specified data onto a surface of a magnetic disk using magnetic printing technology. The head carries out writing of data to/reading of written data from the surface of the magnetic recording disk in a hard disk drive (hereinafter referred to as an "HDD"), which drive is currently mainstream as external computer storage. The magnetic recording disk has as a recording material at its surface a magnetic film.

In the above-described HDD, recording and reproducing of data are carried out while a magnetic head floats on a surface of a rotating magnetic disk as a magnetic recording medium, kept there several tens nanometers from the surface of the disk by a floating mechanism known as a slider. On the magnetic recording medium, bit information is stored in data tracks arranged in concentric circles on the magnetic recording medium. The data recording/reproducing head is moved and positioned at a high speed onto a target data track on the magnetic recording medium to record and reproduce the data.

On the surface of the magnetic recording medium, positioning signals (servo signals) for detecting a position of the head relative to the data track, are written in concentric circles. This allows the head carrying out the recordation and reproduction of data to detect its own position at fixed time intervals. The servo signal is written by using a specialized device known as a servo writer after the magnetic recording medium is mounted in an HDD device, so that the center of the written servo signal causes no eccentricity to the center of the magnetic recording medium (or the center of the path (orbit) of the head).

A recording density in a present stage of development has reached up to 100 Gbits/in$^2$ and, along with this, the recording density is increasing at an annual rate of 60%. Accompanying this, the density of the servo signal used by the head for detecting its own position is increasing, and the time for writing the servo signal has also tended to increase year by year. An accompanying increase in the writing time of the servo signal has become one of the major causes of reduction in manufacturing productivity and an increase in the cost of the HDDs.

Recently, in contrast with the above-described method of writing the servo signal using a writing head of the servo writer, a technological development has occurred concerning a method for dramatically reducing the writing time of servo information. This involves writing the servo signal in a lump by magnetic printing.

Figure 3A:
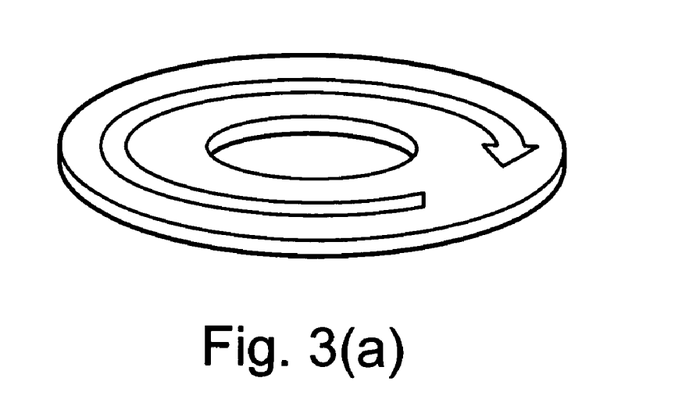
FIGS. 3(a) to 3(c) are views for explaining a process of magnetic printing in a magnetic recording medium.
Figure 3B:
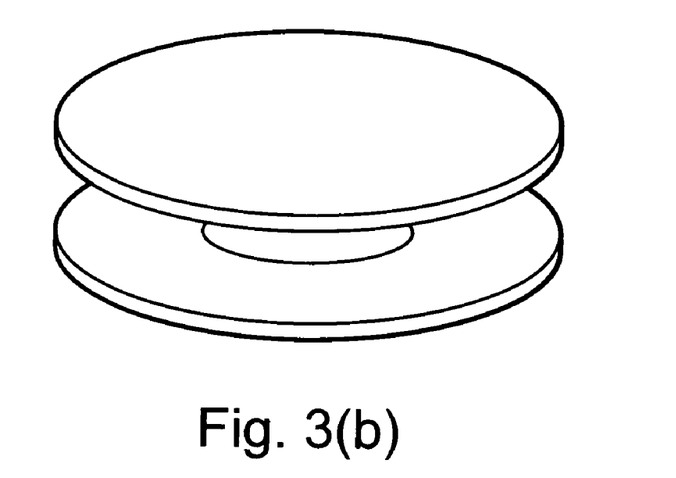
Figure 3C:
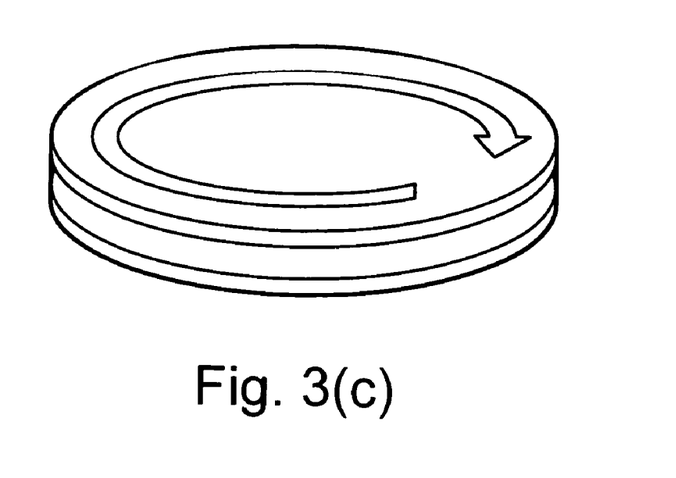
Figure 4A:
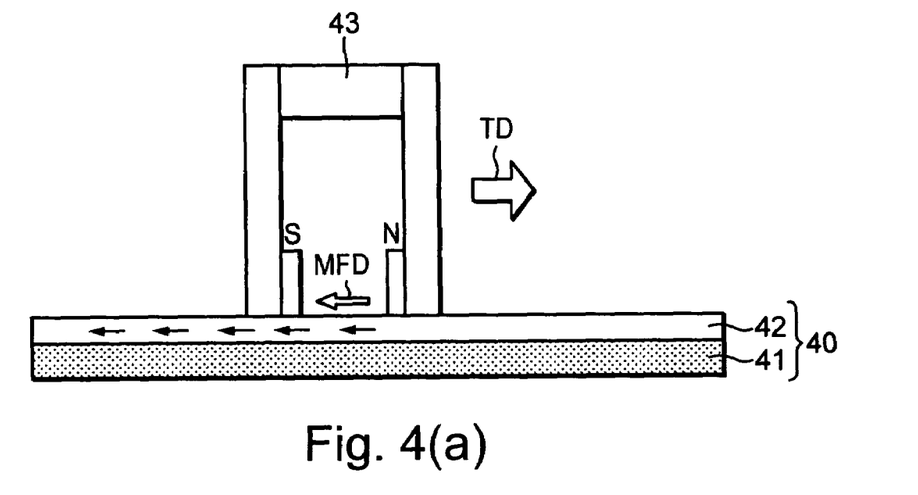
FIGS. 4(a) and 4(b) are views for explaining the principle of magnetic printing in the magnetic recording medium.
Figure 4B:
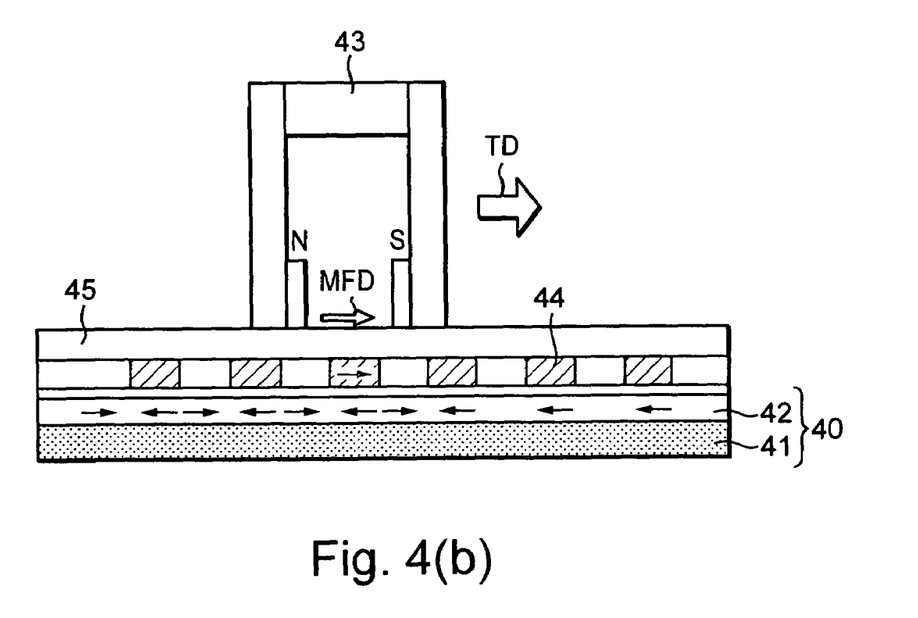

FIGS. 3(a) to 3(c) and FIGS. 4(a) and 4(b) are views for explaining a magnetic printing technology. FIGS. 3(a) to 3(c) are views for explaining process steps of magnetic printing in a magnetic recording medium. FIGS. 4(a) and 4(b) are views for explaining the principle of the magnetic printing in the magnetic recording medium.

FIG. 4(a) shows from the direction of a cross section of a substrate, a state in which a permanent magnet with magnetic field flux lines in a direction MFD moves in a direction TD on the surface of a magnetic recording medium while keeping a fixed distance (one mm or less) therefrom. A magnetic film 42 deposited on a substrate 41 forming a magnetic recording medium 40, initially is not magnetized in a definite direction. However, the film 42 becomes magnetized in a definite direction by a leakage magnetic flux emanating from a gap of a permanent magnet 43 (arrows drawn in the magnetic film in the drawing indicate the direction of magnetization). The step is here referred to as an initial demagnetization step.

The initial demagnetization step shown in FIG. 4(a) corresponds to an initial demagnetization step shown in FIG. 3(a). An arrow in FIG. 3(a) represents the moving path of the permanent magnet 43 in FIG. 4(a), by which the magnetic film 42 is uniformly magnetized. FIG. 3(b) shows a master disk for magnetic printing (hereinafter referred to as a "master disk") laid on the magnetic recording medium to carry out positioning. FIG. 3(c) shows a state of carrying out magnetic printing by bringing the master disk into intimate contact with the surface of the magnetic recording medium and by moving the permanent magnet for magnetic printing along the moving path illustrated by an arrow in the figure.

Moreover, FIG. 4(b) shows the step of writing a printing pattern, and corresponds to FIG. 3(c). The master disk has a structure in which, as shown in the figure, soft magnetic films (from the cobalt family of soft magnetic films) 44 are embedded on a face of a silicon substrate 45 contacting the surface of the magnetic recording medium 40.

As shown in FIG. 4(b), the intervention of the substrate, embedded with patterns of the soft magnetic films, between the permanent magnet 43 and the magnetic recording medium 40, allows the leakage magnetic flux from the permanent magnet 43 that entered the silicon substrate 45 (the direction MFD of a magnetic field for writing printed signal is opposite to the direction of the magnetic field for demagnetization) to pass through the silicon substrate 45 again and magnetize the magnetic film 42 at a position without the soft magnetic film 44. However, at a part with presence of the soft magnetic pattern, the leakage magnetic flux passes through the soft magnetic film 44 so as to form a magnetic circuit with low magnetic resistance. As the magnet 43 is moved in the direction TD across the silicon substrate 45, this reduces the leakage magnetic flux from the silicon substrate 45 to a small amount at a position with the soft magnetic film 44, by which no writing by magnetization is carried out. With the mechanism as above, magnetic printing of the servo signal is carried out.

Figure 5A:
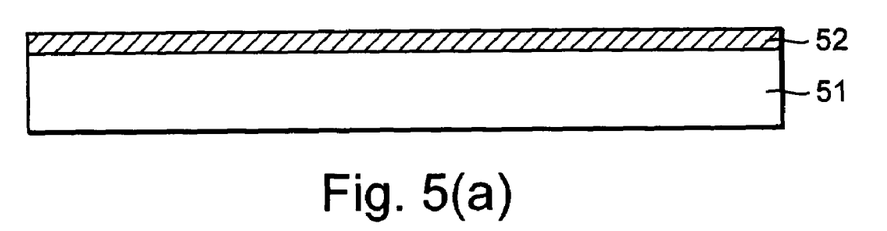
FIG. 5(a) shows the step of applying a resist.
Figure 5B:
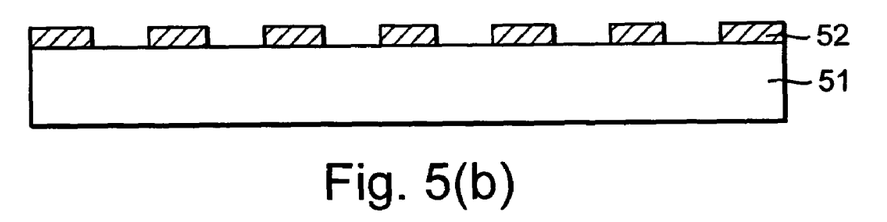
FIG. 5(b) shows the step of patterning the magnetic pattern.
Figure 5C:
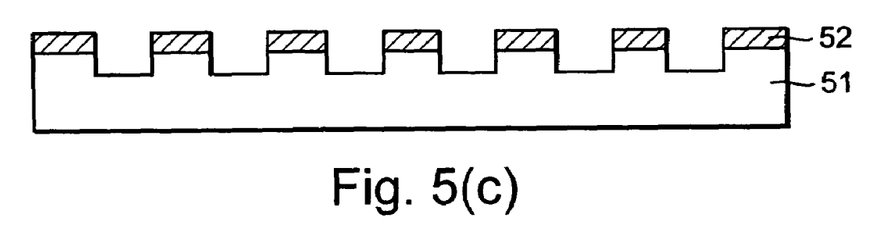
FIG. 5(c) shows the step of etching the silicon substrate.
Figure 5D:
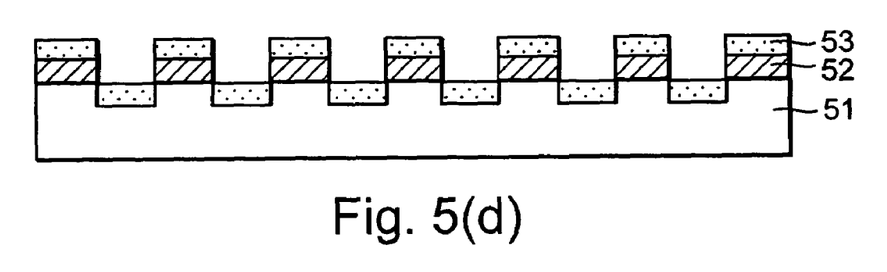
FIG. 5(d) shows the step of sputtering soft magnetic material.
Figure 5E:
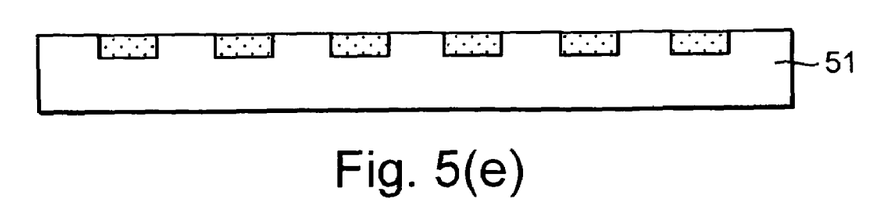
FIG. 5(e) shows a step of lift-off.

FIGS. 5(a) to 5(e) are views for explaining the process steps for manufacturing the master disk. FIG. 5(a) shows the step of applying a resist. FIG. 5(b) shows the step of patterning the magnetic pattern. FIG. 5(c) shows the step of etching the silicon substrate. FIG. 5(d) shows the step of sputtering soft magnetic material. FIG. 5(e) shows the step of lift-off. The respective steps are explained below.

First step: On the surface of a silicon substrate 51 (with a substrate thickness of about 500 μm), a resist 52 (with a thickness of 1.2 μm) is applied by using a spin coater (FIG. 5(a)). Thereafter, patterning is carried out on the resist 52 by employing an optical lithography method similar to that in a manufacturing method for a normal silicon semiconductor (FIG. 5(b)). The resist 52 is used as a mask for etching in a second step, and is formed of a material in the novolak family, which is not so strong against etching. Therefore, it is important for the resist 52 to have such a thickness that it does not disappear even when it is etched.

Second step: By employing a reactive plasma-etching method (reaction gas: methane trichloride), the silicon substrate 51 is subjected to dry etching to the depth of 500 nm (FIG. 5(c)).

Third step: By employing a sputtering method, deposition of a soft magnetic film 53 of Co (cobalt) is carried out to a thickness of 500 nm (FIG. 5(d)).

Fourth step: After the deposition of the Co soft magnetic film 53, the silicon substrate 51 is immersed in a solvent that dissolves the resist 52 (while employing ultra sound and the like as necessary), by which the resist 52 between the Co soft magnetic film 53 and the silicon substrate 51 is dissolved to remove it (FIG. 5(e)).

Japanese Official Gazettes disclosing prior art relating to the invention are described as follows.

The art described in a Japanese patent publication No. JP-A-2001-34938, relates to a master information carrier, by which high density information signals can be uniformly and stably recorded over the whole face of a magnetic recording medium, and a method of manufacturing the carrier. The carrier is provided with a substrate and a ferromagnetic thin film disposed on the substrate so as to form a pattern arranged to correspond to a magnetic pattern with the surface of the ferromagnetic film made approximately flat. Moreover, the art described in a PCT patent publication, WO 00/26904 relates to a master information carrier and a magnetic recording method that uses the carrier, in which a figure pattern corresponding to an arrangement of information signals for being recorded in a magnetic recording medium is provided by an arrangement of ferromagnetic thin films deposited on the surface of a non-magnetic substrate.

Figure 6A:
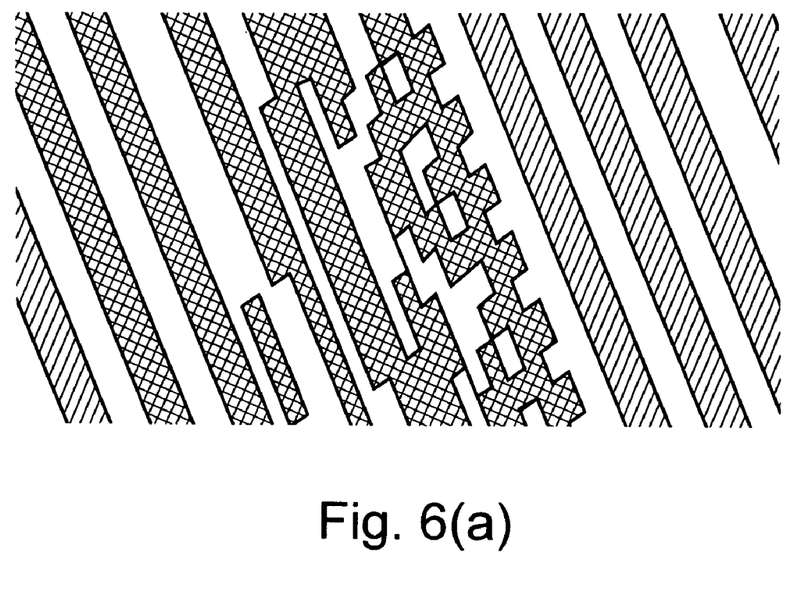
FIG. 6(a) shows a part of a servo pattern.
Figure 6B:
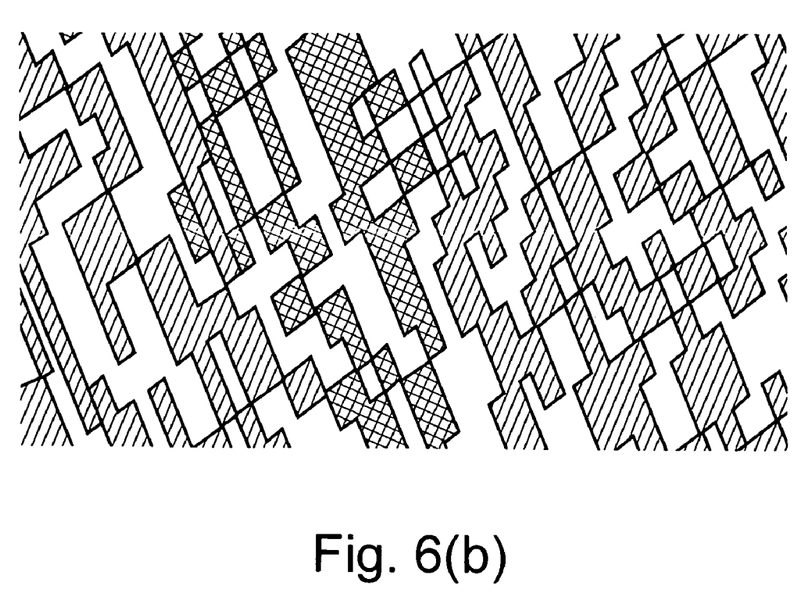
FIG. 6(b) shows patterns of content.

FIGS. 6(a) and 6(b) illustrate shapes of servo patterns. FIG. 6(a) shows a part of the servo pattern. In the figure, cross-hatched regions surrounded by closed curves (although the lines, being magnified in the figure, look like straight lines, they are actually curved lines) are areas where soft magnetic films are formed. FIG. 6(b) shows patterns of contents data. Similarly in this figure, cross-hatched regions surrounded by closed curves (although the lines, being magnified in the figure, look like straight lines, again they are actually curved lines) are areas in which soft magnetic films are formed.

Line widths of the patterns range from one to several lines. In order to carry out magnetic printing of the servo patterns, the same patterns as the servo patterns must be formed on a master disk as patterns of soft magnetic film. The thickness of the soft magnetic film is very important. An excessively thin film thickness causes magnetic saturation when a magnetic field to be printed is applied, which results in leakage of a magnetic flux to the magnetic recording media facing the soft magnetic film. This, in the worst case, causes inversion in magnetization to produce a problem that a region where the data should be "0" have data of "1".

Figure 7A:
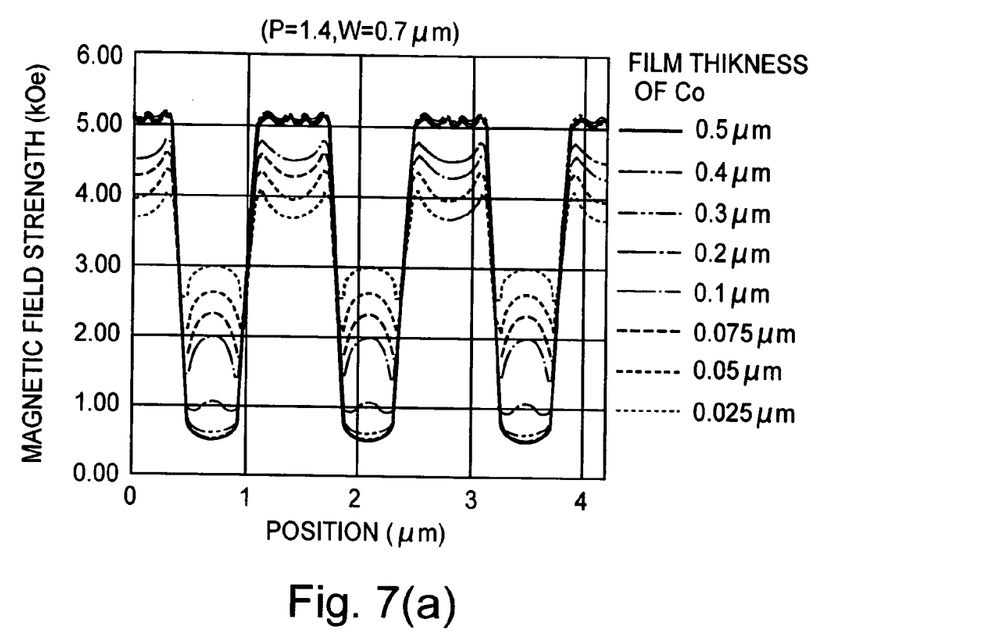
FIGS. 7(a) and 7(b) show magnetic field strength distributions on the surface of a magnetic film at printing.
Figure 7B:
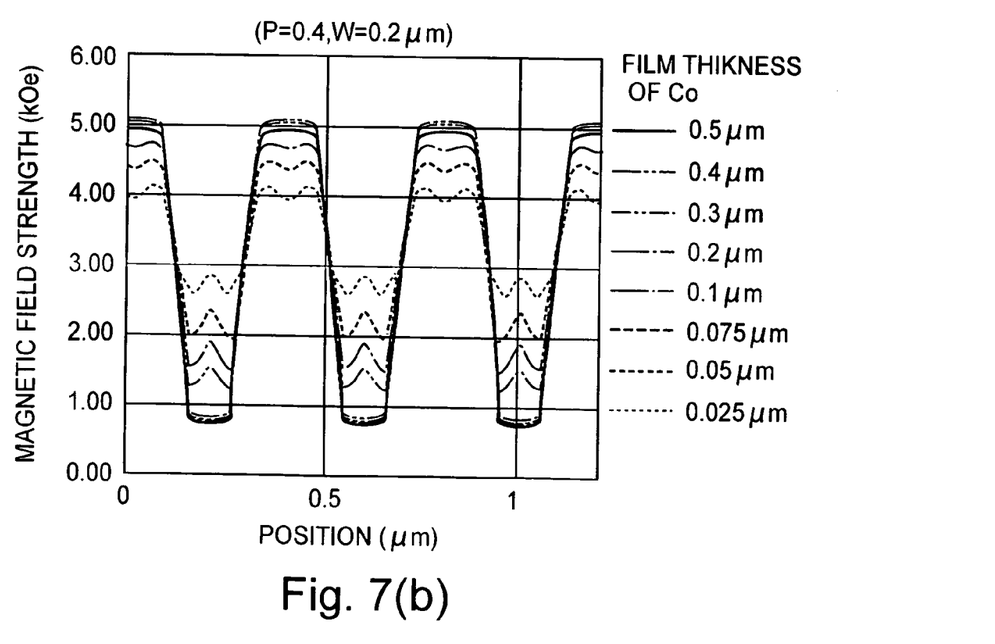
Figure 8A:
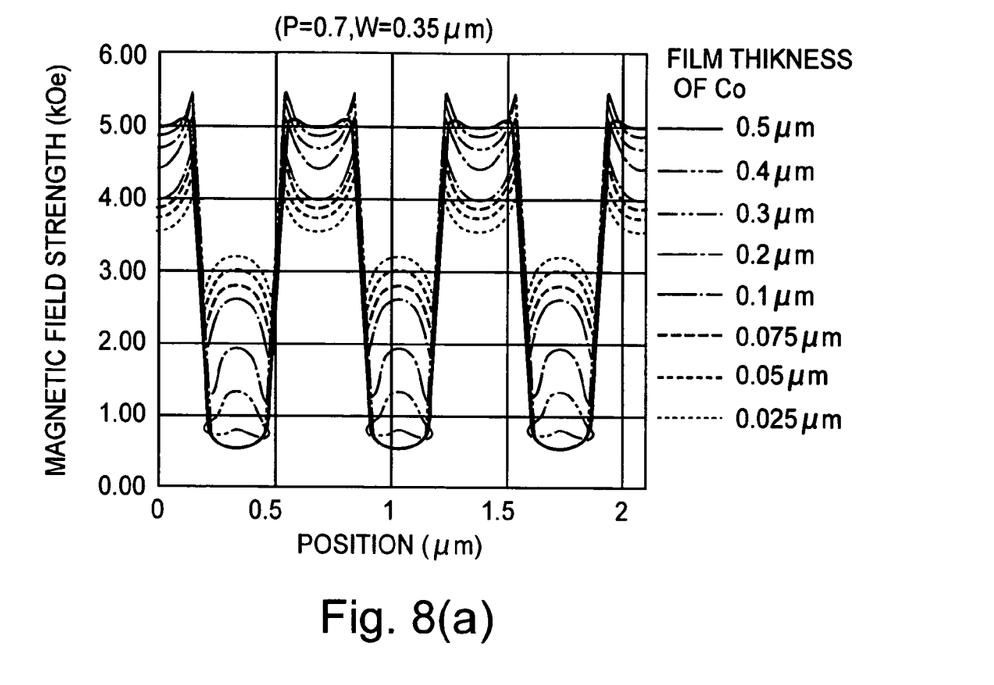
FIGS. 8(a) and 8(b) show other magnetic field strength distributions on the surface of a magnetic film at printing.
Figure 8B:
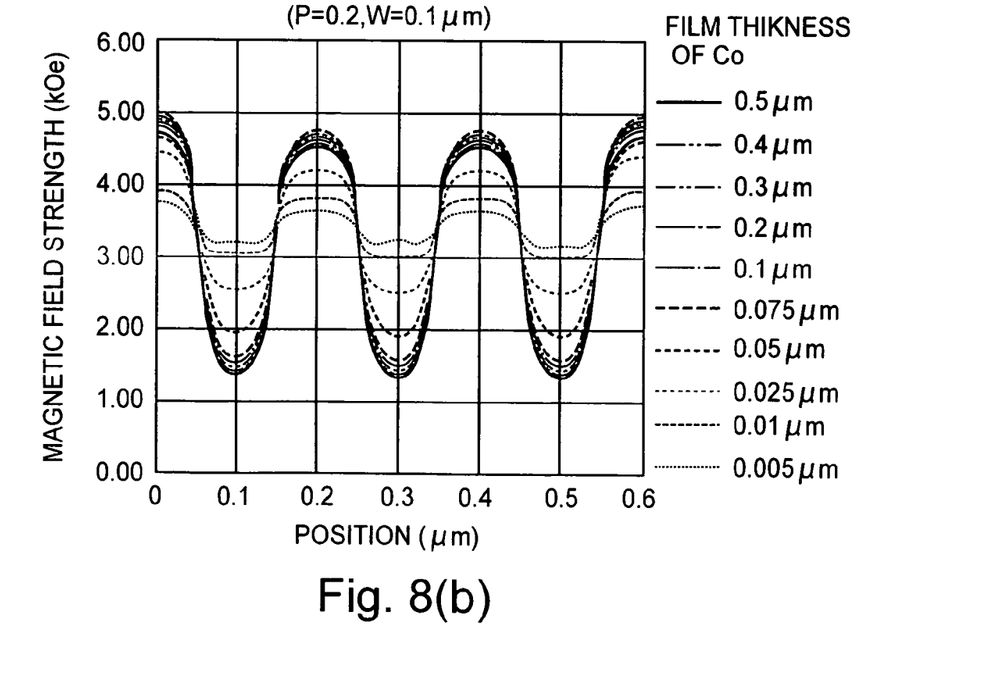

FIGS. 7(a) and 7(b), and 8(a) and 8(b) each show magnetic field strength distributions around the magnetic film of a magnetic recording medium at printing. FIG. 7(a) shows magnetic field strength distributions on the surface of a magnetic recording medium in the case of P=1.4, W=0.7 µm, where P is the pitch and W is the width, of the soft magnetic film. FIG. 7(b) shows magnetic field strength distributions on the surface of a magnetic recording medium in the case of P=0.4, W=0.2 µm. FIG. 8(a) shows magnetic field strength distributions on the surface of a magnetic recording medium in the case of P=0.7, W=0.35 µm. FIG. 8(b) shows magnetic field strength distributions on the surface of a magnetic recording medium in the case of P=0.2, W=0.1 µm.

Namely, FIGS. 7(a) and 7(b), and FIGS. 8(a) and 8(b) are views showing magnetic field strength distributions at the magnetic film of a magnetic recording medium with a printing magnetic field kept constant and the width (the pattern width) and the film thickness of the soft magnetic film of the master disk made to vary. When printing is carried out, the magnetic field strength must be 4 kOe (4000 Oersteds) or more in a region where magnetization is inverted and must be 2 kOe (2000 Oersteds) or less in a region where magnetization is not inverted. The thickness of the soft magnetic film for satisfying the conditions becomes as follows.

Pattern width: 0.7 µm→
   Thickness of the soft magnetic film: 0.20 µm or more
Pattern width: 0.35 µm→
   Thickness of the soft magnetic film: 0.20 µm or more
Pattern width: 0.2 µm→
   Thickness of the soft magnetic film: 0.075 µm or more
Pattern width: 0.1 µm→
   Thickness of the soft magnetic film: 0.050 µm or more When the pattern width of the servo pattern is from 0.1 to 0.7 µm, the thickness of the soft magnetic film must be 0.20 µm or more to avoid magnetic saturation in all of the regions. Practically, however, within film nonuniformity arising in a photo-process and deposition of the soft magnetic film must be taken into consideration. Therefore, the thickness of the soft magnetic film should be 0.30 µm or more. Different cross-sectional shapes, in which a Co soft magnetic film is embedded in a groove etched in a photo-process, are shown respectively in FIGS. 9(a) to 9(g), and a relationship between groove width and film thickness at the groove section is shown in FIG. 10.

Figure 9A:
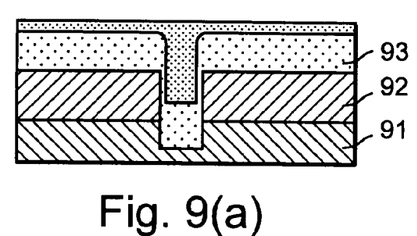
FIGS. 9(a) to 9(g) each show a cross section of a soft magnetic film embedded in a recess.
Figure 9B:
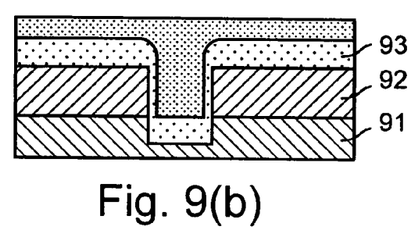
Figure 9C:
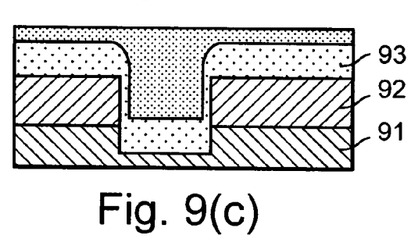
Figure 9D:
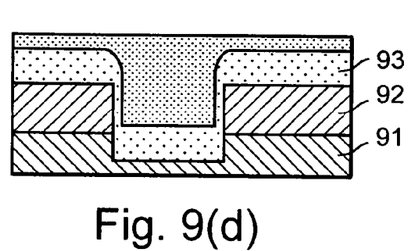
Figure 9E:
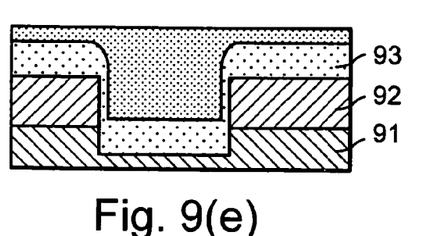
Figure 9F:
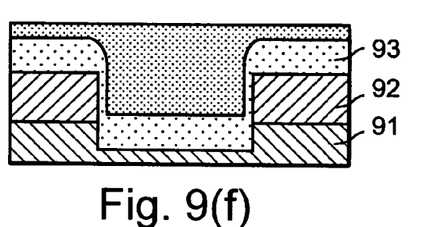
Figure 9G:
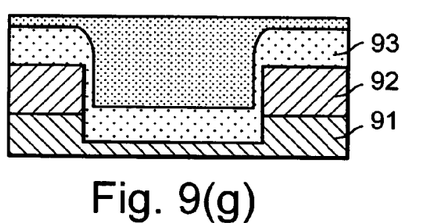

FIG. 9(a) shows a 0.5 µm groove width section. FIG. 9(b) shows a 1.0 µm groove width section. FIG. 9(c) shows a 1.5 µm groove width section. FIG. 9(d) shows a 2.0 µm groove width section. FIG. 9(e) shows a 2.5 µm groove width section. FIG. 9(f) shows a 3.0 µm groove width section. FIG. 9(g) shows a 3.5 µm groove width section. In these figures, reference numeral 91 denotes a silicon substrate, reference numeral 92 denotes a resist, and reference numeral 93 denotes a soft magnetic film.

Figure 10:
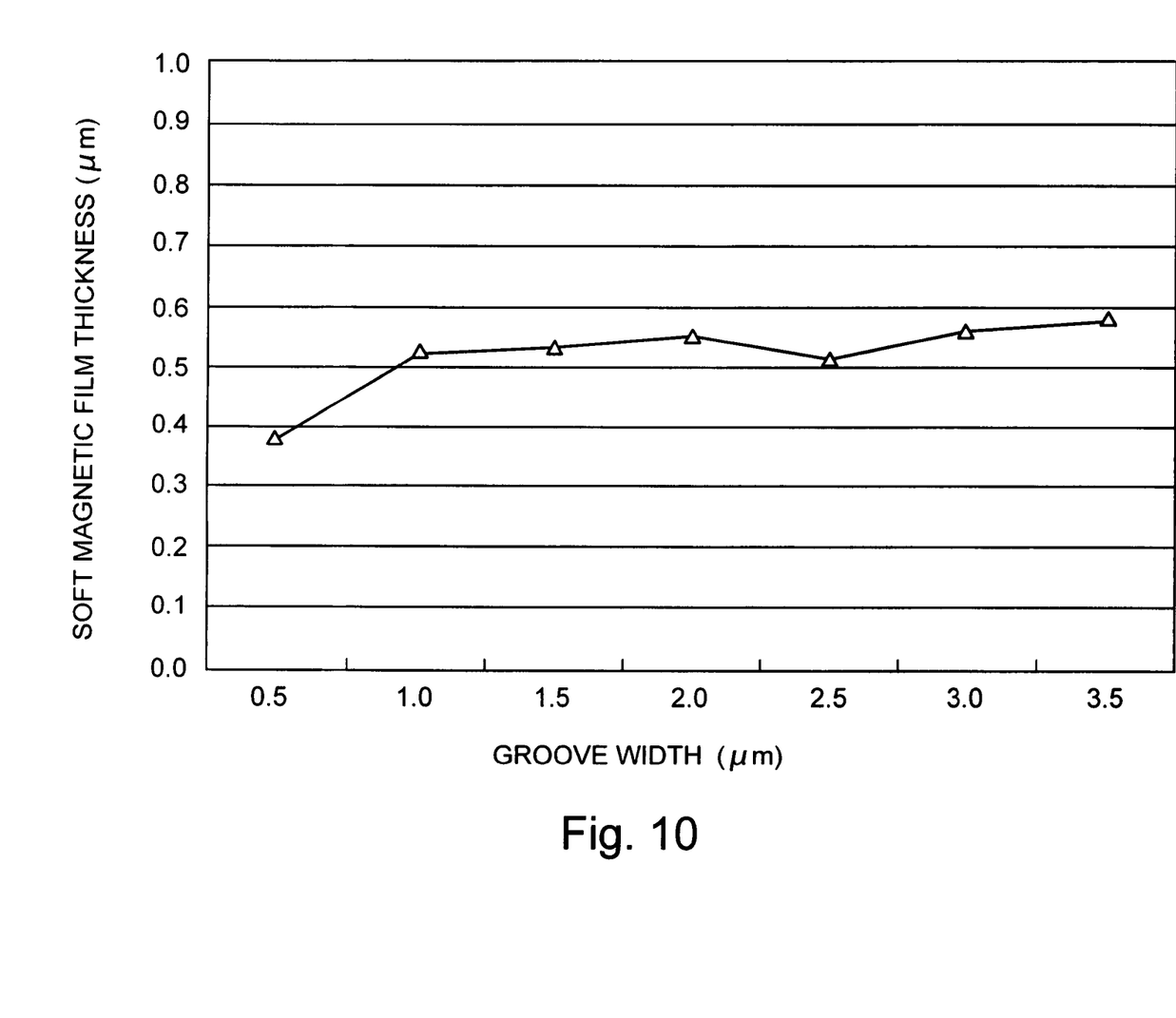
FIG. 10 is a graph showing the groove width dependence upon the film thickness.

From FIGS. 9(a) to 9(f) and FIG. 10, it can be seen that as the groove width becomes smaller, thickness nonuniformity of the soft magnetic film deposited in the groove becomes noticeable. In FIG. 10, it is shown that the nonuniformity becomes non-negligible for groove widths of 1 µm or less. This presents a problem. That is, the narrow the pattern width becomes, the more difficult it becomes to embed the soft magnetic film in a deep groove. Therefore, a method of manufacturing a master disk has been long awaited, which facilitates magnetic printing even for groove widths of 1 µm or less.

OBJECT AND SUMMARY OF THE INVENTION

The invention was made in view of such a problem, with an object to provide a master disk for magnetic printing that enables control of an aspect ratio of a width of a groove to a depth thereof, and along with this, facilitates embedding of a soft magnetic film in the groove for stabilizing magnetic printability by the master disk. Another object is to provide a method of manufacturing such a master disk.

In order to accomplish these objects, the invention provides in a master disk for forming a magnetic pattern in a magnetic recording medium by magnetic printing, at least two or more kinds of depths of grooves for embedding magnetic materials on a substrate of the master disk. In accordance with the other aspects of the invention the depth of the groove for embedding the magnetic material is proportional to a pattern width in a sector direction of a servo pattern. Thus, the depth of the groove for embedding the magnetic material is made shallow in a region where the pattern width of the servo pattern is narrow and made deep in a region where the pattern width is wide. The depth of the groove for embedding the magnetic material may vary stepwise with respect to the pattern width. In a method of manufacturing such a master disk for magnetic printing, the groove for embedding the magnetic material is formed by photolithography in a repetitive manner.

With respect to the above-described subject, the problem caused at the deposition can be eliminated by taking measures that vary the depth of the groove for embedding the soft magnetic film in the silicon substrate of the master disk, depending on the pattern width of the soft magnetic film in the sector direction. The groove depth need not be varied in an analog manner, but may be varied stepwise. When classification of the depths of the grooves is determined, for example, with the magnetic field strengths shown in FIGS. 7(a) and 7(b) and FIGS. 8(a) and 8(b), the depths can be classified into two groups, groove depths of 0.075 μm or more when the pattern widths are 0.1 to 0.2 μm, and 0.2 μm or more when the pattern widths are 0.35 to 0.7 μm. To form grooves with different depths, the first step and the second step shown in FIG. 5 can be carried out repeatedly. However, when the process is made to return from the second step to the first step, lift-off of the resist is necessary.

BRIEF DESCRIPTION OF THE DRAWINGS

FIGS. 2(a)–2(k) are views for explaining process steps for manufacturing a master disk according to the invention where FIG. 2(k) shows a step of chemical-mechanical polishing (CMP).

FIGS. 5(a)–5(e) are views for explaining the steps of a process for manufacturing the master disk, wherein

DETAILED DESCRIPTION OF THE PREFERRED EMBODIMENT

Figure 1A:
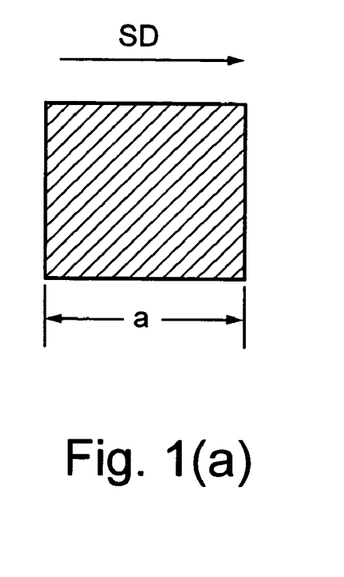
FIGS. 1(a) and 1(b) show shapes of servo patterns.
Figure 1B:
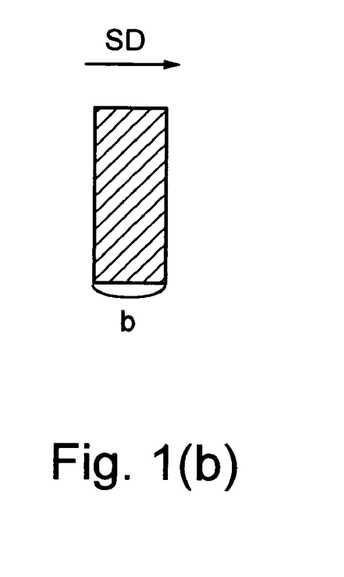
Figure 1C:
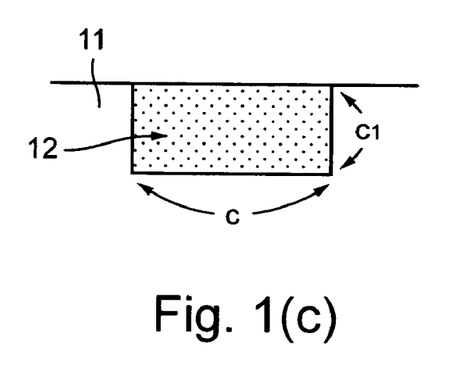
FIGS. 1(c) and 1(d) show shapes of grooves for embedding soft magnetic films according to the invention.
Figure 1D:
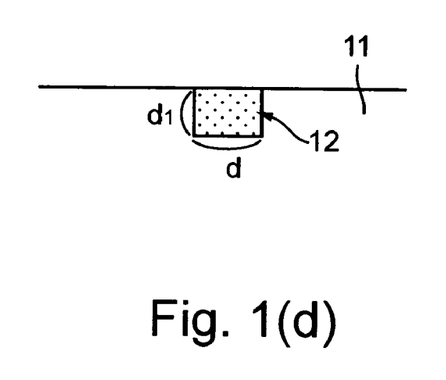

FIGS. 1(a) and 1(b) show shapes of the servo patterns according to the invention. FIGS. 1(c) and 1(d) show the shapes of grooves in which soft magnetic films are embedded, respectively for the servo patterns of FIGS. 1(a) and 1(b). In the figures, reference numeral 11 denotes a silicon (Si) substrate and reference numeral 12 denotes a soft magnetic film.

As described above, characteristic of the invention is that the groove width is constant in the sector direction of the servo pattern, whereas the depth is varied. The servo pattern width "a" in FIG. 1(a) and the width "c" of the groove in FIG. 1(c) are equal to each other (a=c) in the sector direction, and the depth "c1" of the groove in FIG. 1(c) is proportional to the servo pattern width "a" in FIG. 1(a). Similarly, the servo pattern width "b" in FIG. 1(b) and the width "d" of the groove in FIG. 1(d) are equal to each other (b=d) in the sector direction, and the depth "d1" of the groove in FIG. 1(d) is proportional to the servo pattern width "b" in FIG. 1(b).

The depths are required to be such that the soft magnetic films have thicknesses whereby no magnetic saturation occurs due to printing magnetic fields therein. According to the results of analyses of magnetic field strengths on the surface of the magnetic recording medium as shown in FIGS. 7(a) and 7(b) and FIGS. 8(a) and 8(b), the following thicknesses are necessary.

Pattern width: 0.35 μm to 0.7 μm→
   Thickness of the soft magnetic film: 0.20 μm
Pattern width: 0.1 μm to 0.2 μm→
   Thickness of the soft magnetic film: 0.075 μm The analyses of the magnetic field at the surface of the magnetic recording medium shown in FIGS. 7(a) and 7(b) and FIGS. 8(a) and 8(b) treat the pattern widths only in the range from 0.1 μm to 0.7 μm, to determine which of two thicknesses of the soft magnetic film to select. However, since servo track addresses included in the servo patterns are represented by 18 bits, the pattern width may be up to 1.8 μm. This requires further increase in the number of possible thicknesses of the soft magnetic film.

Figure 2A:
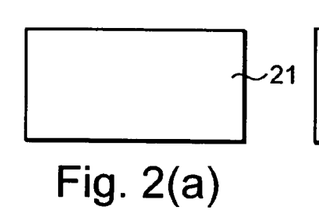
FIG. 2(a) shows a step for preparing a silicon substrate.
Figure 2B:
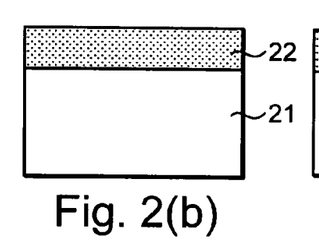
FIG. 2(b) shows a step for applying a resist.
Figure 2C:
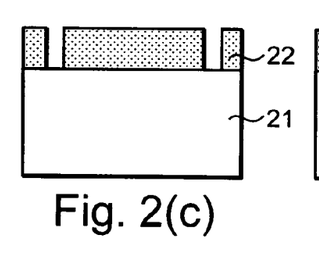
FIG. 2(c) shows a step for patterning a magnetic pattern with a narrow line width.
Figure 2D:
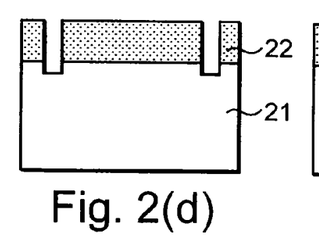
FIG. 2(d) shows an etching step of the silicon substrate.
Figures 2E, 2I:
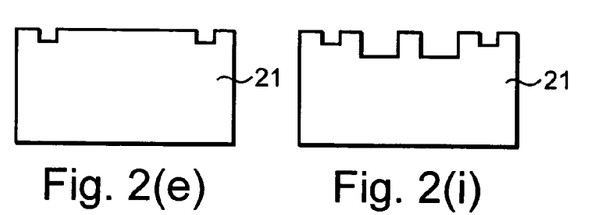
FIG. 2(e) shows a step of removing the resist.
FIG. 2(i) shows a step of further removing the resist.
Figures 2F, 2J:
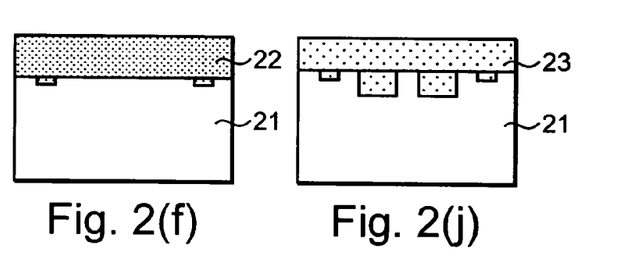
FIG. 2(f) shows the step of applying a resist, FIG. 2(g) showing the patterning of a magnetic pattern with a wide line width.
FIG. 2(j) shows the deposition of a soft magnetic film.
Figures 2G, 2K:
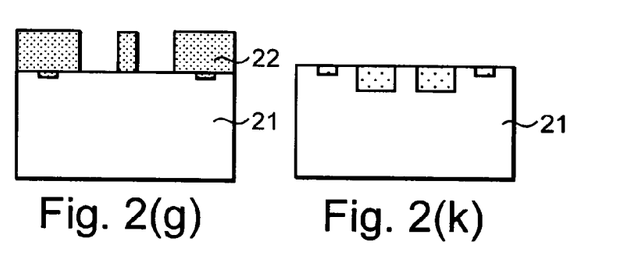
Figure 2H:
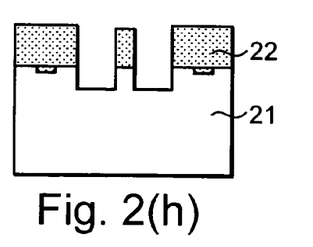
FIG. 2(h) shows a step of etching the silicon substrate.

FIGS. 2(a) to 2(k) are drawings for explaining a method of manufacturing a master disk according to the invention. FIG. 2(a) shows a step of preparing a silicon substrate. FIG. 2(b) shows a step of applying a resist. FIG. 2(c) shows a step of patterning a magnetic pattern with a narrow line width. FIG. 2(d) shows a step of etching of silicon substrate. FIG. 2(e) shows a step of removing the resist. FIG. 2(f) shows another step of applying a resist. FIG. 2(g) shows a step of patterning a magnetic pattern with a wide line width. FIG. 2(h) shows a step of again etching the silicon substrate. FIG. 2(i) shows a step of again removing the resist. FIG. 2(j)

shows a step of depositing a soft magnetic film. FIG. 2(k) shows a step of polishing by CMP (Chemical Mechanical Polishing).

A plurality of photomasks becomes necessary. The number of such photomasks corresponds in number to the possible number of different film thicknesses of the soft magnetic films (the possible number of the depths of the grooves). Namely, in the example, the required number of thicknesses (depths) is two, so that a photomask exclusively for a region with a film thickness of 075 µm and a photomask exclusively for a region with a film thickness of 0.20 µm, are required. In the following, explanations are provided for the successive process steps.

First step: A silicon substrate 21 (substrate thickness of about 500 µm) is prepared (FIG, 2(a)).

Second step: A resist 22 is applied (FIG. 2(b)).

Third step: Patterning is carried out using a photomask for application only for a region with a soft magnetic film having a thickness of 0.075 µm (FIG. 2(c)).

Moreover, in an unillustrated development step, parts of the resist irradiated with light are removed to print the pattern of the photomask on the resist.

Fourth step: By employing a reactive plasma-etching method (reaction gas: methane trichloride), dry etching of the silicon substrate 21 is carried out to a depth of 75 nm to form grooves (FIG. 2(d)).

Fifth step: The resist 22 is removed by a resist stripper to expose the face of the silicon substrate 21 (FIG. 2(e)).

Sixth step: A resist is applied again (FIG. 2(f)).

Seventh step: Patterning is carried out using a photomask for application only to a region with soft magnetic film having a thickness of 0.2 µm (FIG. 2(g)).

Moreover, in the unillustrated development step, parts of the resist irradiated with light are removed to print the pattern of the photomask on the resist.

Eighth step: By employing a reactive plasma-etching method (reaction gas: methane trichloride), dry etching of the silicon substrate 21 is carried out to a depth of 200 nm to form grooves (FIG. 2(h)).

Ninth step: The resist 22 applied in the sixth step is removed by a resist stripper to expose the face of the silicon substrate 21 (FIG. 2(i)).

Tenth step: A soft magnetic film 23 is deposited on the silicon substrate 21 by a sputtering device and the like. At this time, the soft magnetic film is made to have a thickness from the bottom of the grooves measured such that the film extends sufficiently above the surface of the silicon substrate 21 (FIG. 2(j)).

Eleventh step: The portion of the soft magnetic film 23 deposited above the surface of the silicon substrate 21 is removed by CMP (Chemical Mechanical Polishing) (FIG. 2(k)).

In the above-explained eleventh step, by knowing beforehand the proper rate of polishing the silicon (Si) substrate and the polishing rate of the magnetic film of Co and the like by CMP, and also knowing the thickness of the soft magnetic film deposited on the silicon substrate, it becomes possible to estimate the polishing time with CMP. Actually, however, the polishing is carried out with some margin given to the estimated polishing time. At the early stage of the polishing, the soft magnetic film deposited on the silicon substrate is polished. When the polishing reaches the silicon substrate, the speed of the polishing is slowed to allow only a small amount to be polished in a unit time.

In the invention, the resist is used as an etching mask. However, alternatively a $SiO_2$ film can be used as an etching mask. This, however, requires complicated processes to be performed as described below, in which the previously-described first step to the fourth step and the fifth step to the eighth step are replaced by the respective steps described below. Characteristic of using a $SiO_2$ mask is that polishing selectivity of Co to $SiO_2$ film is increased at the eleventh step, and the $SiO_2$ film is slow to be polished, which provides an advantage in that the depth of the groove embedding the soft magnetic film is provided accurately.

When a $SiO_2$ film is used as an etching mask, the first step and fifth step each include a thermal oxidation treatment of the silicon substrate to form the $SiO_2$ film on the silicon surface. In each of the second step and sixth step of the process a resist is applied to the face of the $SiO_2$ film. In both the third step and the seventh step, patterning of the resist is carried out for development. In each of the fourth step and eight step the following is performed. The $SiO_2$ film is etched using the mask of the resist. Next, ashing of the resist is carried out. Then etching of the silicon substrate is carried out using the $SiO_2$ film mask.

As was explained above, according to the invention, in a master disk for forming a magnetic pattern in a magnetic recording medium by magnetic printing, at least two different depths of grooves for embedding magnetic materials are provided on a substrate of the master disk. Therefore, the depths of the grooves for embedding the soft magnetic film can be made shallow in a region where the pattern width of the servo pattern is narrow and made deep in a region where the pattern width is wide. This enables control of an aspect ratio of width to depth to facilitate embedding the soft magnetic film in the groove. This can provide stabilization of magnetic printability by the master disk.

What is claimed is:

1. A master disk for magnetic printing, the master disk forming a magnetic pattern in a magnetic recording medium by the magnetic printing, the magnetic disk including
    a substrate having grooves, the grooves including grooves of different depths; and
    magnetic materials embedded on a substrate in the grooves of different depths.

2. A method of manufacturing the master disk of claim 1, including forming the groove by repetitive photolithography.

3. The master disk for magnetic printing as claimed in claim 1, wherein the depths of the grooves for embedding the magnetic material is proportional to a pattern width in a sector direction of a servo pattern.

4. The master disk for magnetic printing as claimed in claim 3, wherein the depth of the grooves for embedding the magnetic material varies stepwise with respect to the pattern width of the servo pattern.

5. A method of manufacturing the master disk of claim 3, including forming the grooves by repetitive photolithography.

6. A method of manufacturing the master disk of claim 4, including forming the grooves by repetitive photolithography.

7. The master disk for magnetic printing as claimed in claim 3, wherein the grooves for embedding the magnetic material have a first region where the pattern width of the servo pattern is narrow and a second region where the pattern width is wide, wherein the grooves are shallow in the first region, and deep in the second region.

8. The master disk for magnetic printing as claimed in claim 7, wherein the depth of the grooves for embedding the magnetic material varies stepwise with respect to the pattern width of the servo pattern.

9. A method of manufacturing the master disk of claim 8, including forming the grooves by repetitive photolithography.

10. A method of manufacturing the master disk of claim 7, including forming the grooves by repetitive photolithography.

* * * * *